United States Patent
Park et al.

(10) Patent No.: US 11,656,390 B2
(45) Date of Patent: May 23, 2023

(54) METHOD OF MANUFACTURING MODULE HAVING MULTIPLE PATTERN AREAS, MODULE HAVING MULTIPLE PATTERN AREAS ACCORDING TO THE METHOD, AND METHOD OF MANUFACTURING DIFFRACTION GRATING MODULE OR MOLD FOR DIFFRACTION GRATING MODULE

(71) Applicant: LG CHEM, LTD., Seoul (KR)

(72) Inventors: Jeong Ho Park, Daejeon (KR); Bu Gon Shin, Daejeon (KR); Eun Kyu Her, Daejeon (KR); Jung Hwan Yoon, Daejeon (KR); So Young Choo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 529 days.

(21) Appl. No.: 16/636,469

(22) PCT Filed: Aug. 1, 2018

(86) PCT No.: PCT/KR2018/008760
§ 371 (c)(1),
(2) Date: May 5, 2020

(87) PCT Pub. No.: WO2019/035579
PCT Pub. Date: Feb. 21, 2019

(65) Prior Publication Data
US 2020/0271836 A1  Aug. 27, 2020

(30) Foreign Application Priority Data
Aug. 18, 2017 (KR) .................. 10-2017-0104985

(51) Int. Cl.
*G02B 5/18* (2006.01)

(52) U.S. Cl.
CPC ......... *G02B 5/1847* (2013.01); *G02B 5/1819* (2013.01)

(58) Field of Classification Search
CPC ............... G02B 5/1847; G02B 5/1819; G02B 2027/0109; G02B 2027/0125; G02B 27/0172; G02B 5/1857
See application file for complete search history.

(56) References Cited

U.S. PATENT DOCUMENTS

| | | | |
|---|---|---|---|
| 10,564,332 B2 * | 2/2020 | Meyer Timmerman Thijssen ...... | G02B 6/0016 |
| 2007/0188837 A1 * | 8/2007 | Shimizu ............. | G02B 27/0172 359/13 |
| 2008/0042425 A1 | 2/2008 | Gouelibo et al. | |

FOREIGN PATENT DOCUMENTS

| | | |
|---|---|---|
| JP | 2008-140507 A | 6/2008 |
| JP | 2015-49376 A | 3/2015 |

(Continued)

*Primary Examiner* — Robert E. Tallman
(74) *Attorney, Agent, or Firm* — Dentons US LLP

(57) ABSTRACT

A method of manufacturing a module having multiple pattern areas, a module having multiple pattern areas according to the method, and a method of manufacturing a diffraction grating module or a mold for a diffraction grating module. The method of manufacturing a module having multiple pattern areas comprises: disposing a first substrate having a first pattern on a first base substrate; forming a first cutting line on the first substrate; forming a second cutting line on the first substrate; removing any one of a first area defined by the first cutting line and a second area defined by the second cutting line from the first substrate to form a removed area on the first substrate; disposing a second base substrate having a second pattern different from the first pattern in the removed area; and removing the first substrate from the base substrate without removing the first and second areas.

11 Claims, 5 Drawing Sheets

(56) References Cited

FOREIGN PATENT DOCUMENTS

| KR | 10-1998-0020691 A | 6/1998 |
|----|-------------------|--------|
| KR | 10-2011-0112395 A | 10/2011 |
| KR | 10-2013-0112058 A | 10/2013 |
| KR | 10-2014-0118372 A | 10/2014 |
| KR | 10-2016-0025610 A | 3/2016 |

\* cited by examiner

[Figure 1]
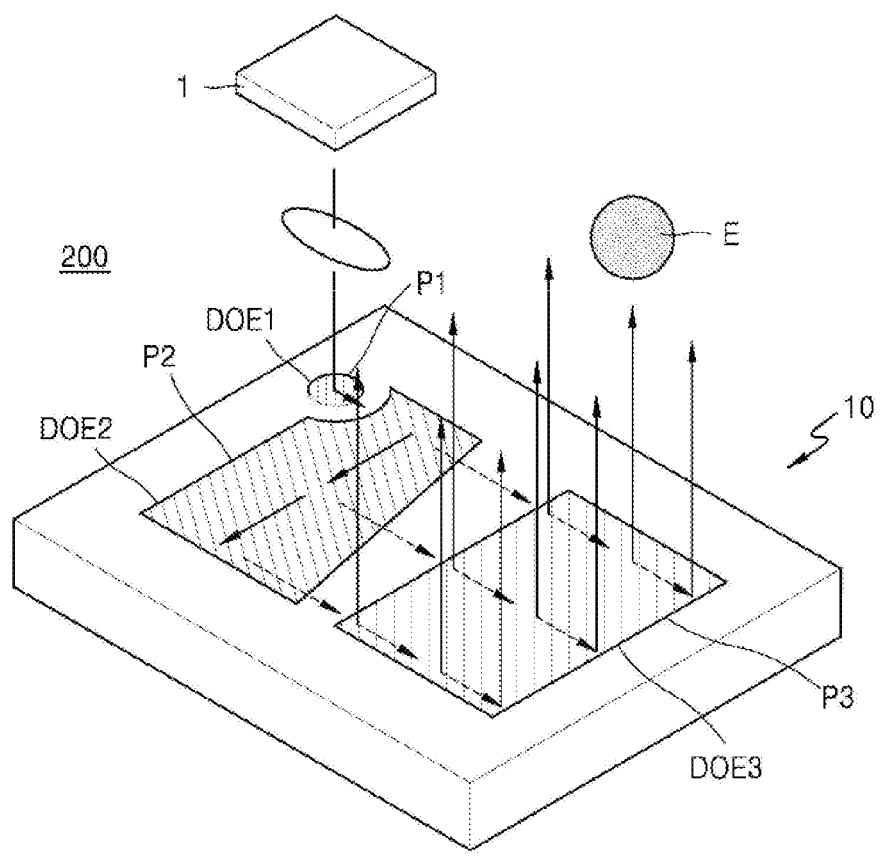

[Figure 2]
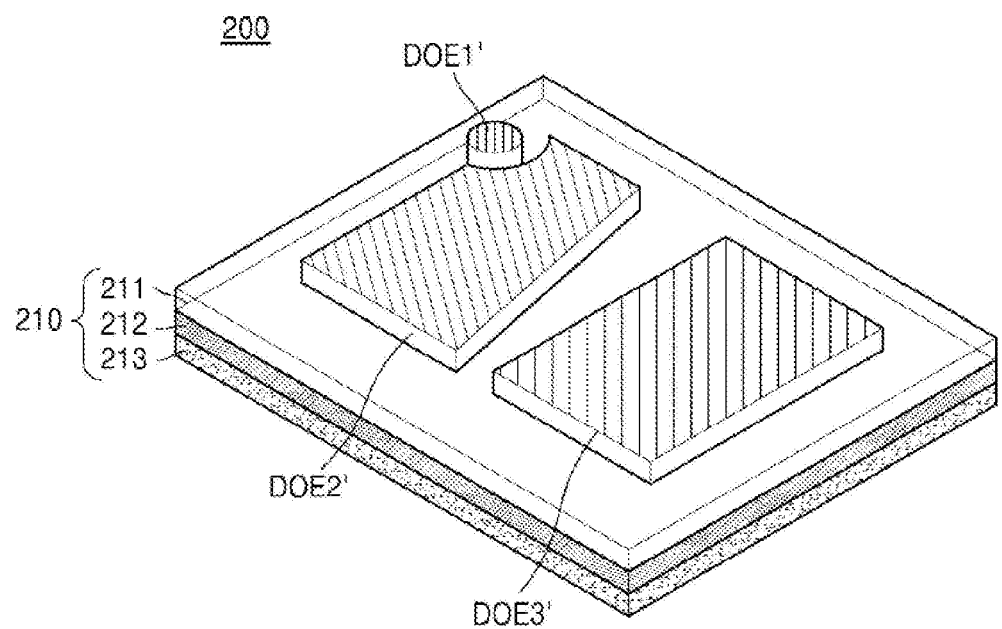

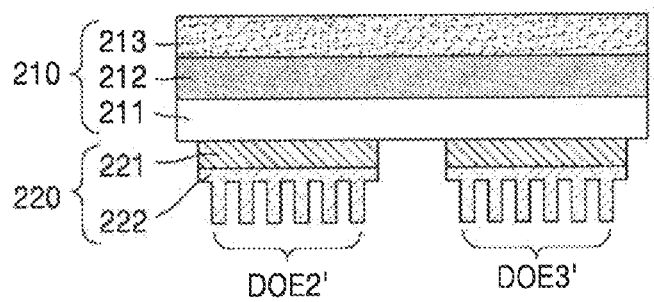
[Figure 5A]
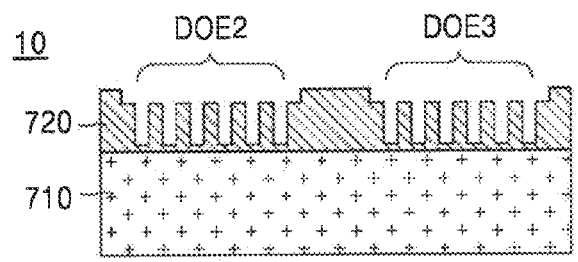
Figure 5B

METHOD OF MANUFACTURING MODULE HAVING MULTIPLE PATTERN AREAS, MODULE HAVING MULTIPLE PATTERN AREAS ACCORDING TO THE METHOD, AND METHOD OF MANUFACTURING DIFFRACTION GRATING MODULE OR MOLD FOR DIFFRACTION GRATING MODULE

CROSS-REFERENCE TO RELATED APPLICATIONS

This application is a U.S. national phase of international application No. PCT/KR2018/008760, filed Aug. 1, 2018, and claims priority from Korean patent application No. KR 10-2017-0104985, filed Aug. 18, 2017, the contents of which are incorporated by reference as if fully set forth herein.

TECHNICAL FIELD

Exemplary embodiments of the present invention relate to a method of manufacturing a module having multiple pattern areas, a module having multiple pattern areas according to the method, and a method of manufacturing a diffraction grating module or a mold for a diffraction grating module.

BACKGROUND ART

As an example of a head mounted display (HMD) device, research on a see-through display or an Augmented Reality (AR) display device, in which external light passes as it is and light output through a micro light source output device may be propagated on an optical waveguide through the plurality of diffraction grating elements and reach a pupil of an eye of a user again, has recently actively progressed.

The plurality of diffraction grating elements has a fine pattern of a sub micro pitch for effectively diffracting light of a visible light wavelength area, and a shape, a structure, an orientation angle, and the like of each of the diffraction grating elements need to be precisely designed and the diffraction grating elements need to be manufactured according to the design.

To this end, in the related art, a series of complex electron beam lithography or photolithography, an etching process, and the like need to be repeatedly accompanied in each of the plurality of diffraction grating elements, so that a long time is taken and a process of high difficulty is required.

Further, even when it is desired to change a design of only a part of the plurality of diffraction grating elements, lots of time and cost are consumed due to complex and difficult processes.

TECHNICAL SUMMARY

Exemplary embodiments of the present invention provide a method of manufacturing a module having multiple pattern areas, a module having multiple pattern areas according to the method, and a method of manufacturing a diffraction grating module or a mold for a diffraction grating module.

An object to be solved in the present invention is not limited to the aforementioned objects, and other objects not-mentioned herein will be clearly understood by those skilled in the art from descriptions below.

TECHNICAL SOLUTION

One aspect of the present invention provides a method of manufacturing a module having multiple pattern areas in order to manufacture a diffraction grating module including a first diffraction grating element and a second diffraction grating element having different diffraction grating patterns, the method including: (a) disposing a first substrate formed with a first pattern on a base substrate; (b) forming a first cutting line having a layout corresponding to a layout of a first diffraction grating element on the first substrate; (c) forming a second cutting line having a layout corresponding to a layout of a second diffraction grating element on the first substrate; (d) removing any one of a first area defined by the first cutting line and a second area defined by the second cutting line from the first substrate; (e) disposing a second base substrate, which is formed with a second pattern different from the first pattern and has a layout corresponding to a removed area removed from the first substrate, in the removed area; and (f) removing the first substrate from the base substrate while leaving the first area and the second area.

An alignment relationship between the first diffraction grating element and the second diffraction grating element may be set in the diffraction grating module, and in operations (b) and (c), the first cutting line or the second cutting line may be formed so as to correspond to the alignment relationship.

The layout of the first cutting line may be an image corresponding to the layout of the first diffraction grating element, and the layout of the second cutting line may be an image corresponding to the layout of the second diffraction grating element.

The layout of the first cutting line may be a reverse image for the layout of the first diffraction grating element, and the layout of the second cutting line may be a reverse image for the layout of the second diffraction grating element.

The diffraction grating module may include a third diffraction grating element having a different diffraction grating pattern from the diffraction grating pattern of at least one of the first diffraction grating element and the second diffraction grating element, and the method may further include (g) forming a third cutting line having a layout corresponding to a layout of the third diffraction grating element on the first substrate, and a third area may be defined by the third cutting line, and in operation (f), the first substrate may be removed from the base substrate while leaving the first area, the second area, and the third area.

An alignment relationship between the first diffraction grating element, the second diffraction grating element, and the third diffraction grating element may be set within the diffraction grating module, and in operations (b), (c), and (g), the first cutting line, the second cutting line, or the third cutting line may be formed so as to correspond to the alignment relationship.

The layout of the first cutting line may be an image corresponding to a layout of the first diffraction grating element, the layout of the second cutting line may be an image corresponding to a layout of the second diffraction grating element, and the layout of the third cutting line may be an image corresponding to a layout of the third diffraction grating element.

The layout of the first cutting line may be a reverse image for the layout of the first diffraction grating element, the layout of the second cutting line may be a reverse image for the layout of the second diffraction grating element, and the layout of the third cutting line may be a reverse image for the layout of the third diffraction grating element.

Another aspect of the present invention provides a module having multiple pattern areas manufactured by the manufacturing method according to one aspect of the present invention.

The module having the multiple pattern areas may be a mold for a diffraction grating module for manufacturing a diffraction grating module including a first diffraction grating element and a second diffraction grating element having different diffraction grating patterns.

Still another aspect of the present invention provides a method of manufacturing a diffraction grating module or a mold for a diffraction grating module, the method including: preparing the module having the multiple pattern areas; applying a resin composition on the module having the multiple pattern areas; forming corresponding pattern areas corresponding to the multiple pattern areas by curing the resin composition; and separating the module having the multiple pattern areas and the corresponding pattern area.

ADVANTAGEOUS EFFECTS

According to the manufacturing method according to one aspect of the present invention, it is possible to easily modulate and manufacture a module formed with a plurality of patterns for each area.

The module formed with the plurality of patterns manufactured according to the manufacturing method according to one aspect of the present invention may be used as a mold usable in an imprinting process, so that it is possible to easily copy a target product, which may be manufactured by the mold, and manufacture the large amount of target products.

In addition, in a situation where it is necessary to change at least one of the layouts of the diffraction grating elements, the alignment relationship, and the pitch of the diffraction grating pattern in the diffraction grating module desired to be manufactured, it is possible to manufacture the mold for the diffraction grating module for manufacturing an easily changed diffraction grating module only by changing the layout of the cutting line corresponding to the factors, which need to be changed, and the alignment relationship and/or performing the change to the substrate having the different pattern from that of the existing substrate when the manufacturing method according to the second aspect of the present invention is used.

Of course, the range of the exemplary embodiments of the present invention is not limited by the effect.

BRIEF DESCRIPTION OF DRAWINGS

FIG. 1 is a perspective view conceptually illustrating a display device including a diffraction grating module and a movement path of light.

FIG. 2 is a perspective view conceptually illustrating a module having multiple pattern areas according to a first aspect of the present invention.

FIGS. 5(A) and 5(B) are perspective views conceptually illustrating a diffraction grating module or a mold for a diffraction grating module manufactured through the manufacturing method according to the third aspect of the present invention.

EXPLANATION OF REFERENCE NUMERALS

Figure 3A:
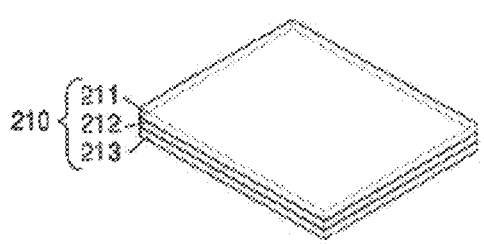
FIGS. 3(A) to 3(F) are perspective views conceptually illustrating a method of manufacturing a module having multiple pattern areas according to a second aspect of the present invention.

10: Diffraction grating module
200: Secondary mold for diffraction grating module
210: Base substrate
220: First substrate
230: Second substrate
P1': First pattern
P2': Second pattern
P3': Third pattern
C1: First cutting line
C2: Second cutting line
C3: Third cutting line
DOE1: First diffraction grating element
DOE2: Second diffraction grating element
DOE3: Third diffraction grating element
DOE1': First area
DOE2': Second area
DOE3': Third area

DETAILED DESCRIPTION

Hereinafter, exemplary embodiments of the present invention will be described with reference to the accompanying drawings in detail. The accompanying drawing illustrates an illustrative form of the present invention, and is simply provided for describing the present invention in detail, and the technical scope of the present invention is not limited by the accompanying drawing. Further, the exemplary embodiment of the present invention is provided in order to more completely explain the present invention to those having average knowledge in the art. In the drawing, shapes, sizes, and the like of the elements may be exaggerated for clearer explanation.

In the description of the present invention, the case where a member is positioned "on" another member includes the case where a member is in contact with another member, and the case where another member is present between the two members.

In the description of the present invention, unless explicitly described to the contrary, the word "comprise" and variations such as "comprises" or "comprising", will be understood to imply the inclusion of stated elements but not the exclusion of any other elements.

FIG. 1 is a perspective view conceptually illustrating a display device including a diffraction grating module and a movement path of light.

A display device including a diffraction grating module may be a head mounted display (HMD) device, and may be a see-through display or an Augmented Reality (AR) display device, in which external light passes as it is and light output through a micro light source output device may be propagated on an optical waveguide through the plurality of diffraction grating elements and reach a pupil of an eye of a user again, among the HMD devices.

Referring to FIG. 1, a diffraction grating module 10 may include a first diffraction grating element DOE1 (for example, an element, into which light output through a micro light source output element 1 is incident) including a diffraction grating pattern formed of patterns of several hundreds of nanometer scale having different pitches, and a second diffraction grating element (for example, an element performing a function of so-called "exit pupil expansion" so that a small optical image, which is an assembly of light output through the micro light source output element 1 has an expanded form in the pupil of an eye of a user). In addition, the diffraction grating module 10 may further include a third diffraction grating element DOE3 (for example, an element, which emits light and makes the light reach and be incident into the pupil), which has a different diffraction grating pattern from that of any one of the first diffraction grating element DOE1 and the second diffraction grating element DOE2.

The diffraction grating pattern included in the diffraction grating element may be provided to diffract light so that light reaching the diffraction grating element is totally reflected in an optical waveguide.

The diffraction grating pattern may be a recess pattern, in which an elongated recess having a depth is repeatedly represented in a direction orthogonal to a longitudinal direction of the recess. Herein, a depth of the diffraction grating pattern included in one diffraction grating element may be uniform or changed according to a longitudinal direction, in which the diffraction grating pattern is repeatedly represented. Herein, a pitch of the diffraction grating pattern included in one diffraction grating element may have a predetermined value.

The first diffraction grating element DOE1 may have a first diffraction grating pattern P1, and may diffract light output from a micro light source output element through the first diffraction grating pattern P1 and induce the light to the optical waveguide. The light induced to the optical waveguide of the first diffraction grating element DOE1 is totally reflected and is propagated to the second diffraction grating element DOE2.

The second diffraction grating element DOE2 may have a second diffraction grating pattern P2, and may diffract the light propagated from the first diffraction grating element DOE1 through the second diffraction grating pattern P2 and induce the light to the optical waveguide. The light induced to the optical waveguide of the second diffraction grating element DOE2 is totally reflected and is propagated to the third diffraction grating element DOE3. Herein, the second diffraction grating pattern P2 may be a different recess pattern from that of the first diffraction grating pattern P1 so that the light propagated from the first diffraction grating element DOE1 is diffracted and induced to the optical waveguide and the light is propagated toward the third diffraction grating element DOE3, and further, an image formed by the light output through the micro light source output element 1 is more widely formed (exit pupil expansion). For example, a pitch and/or a longitudinal direction of the recess pattern of the second diffraction grating pattern P2 may be different from those of the first diffraction grating pattern.

The third diffraction grating element DOE3 may have a third diffraction grating pattern P3, and may diffract the light propagated from the second diffraction grating element DOE2 through the third diffraction grating pattern P3 and induce the light to the optical waveguide. The light induced to the optical waveguide of the third diffraction grating element DOE3 is totally reflected and is propagated toward an eye E of a user. Herein, the third diffraction grating pattern P3 may have a different recess pattern from that of at least one of the first diffraction grating pattern P1 and the second diffraction grating pattern P2 so that the light propagated from the second diffraction grating element DOE2 is diffracted and induced to the optical waveguide and the light is propagated to the pupil of the eye of the user. For example, a pitch and/or a longitudinal direction of the recess pattern of the third diffraction grating pattern P3 may be different from those of the second diffraction grating pattern P2. Herein, the third diffraction grating pattern P3 and the first diffraction grating pattern P1 may have the same pitch and/or the same longitudinal direction of the recess pattern, but the pitch and/or the longitudinal direction of the recess pattern may also be different according to factors, such as an incidence angle of light incident into the first diffraction grating element DOE1, a refractive index of each diffraction grating element, a pattern pitch of the diffraction grating pattern, and an angle of light guided into the diffraction grating element according to an alignment angle, and an optical design of the diffraction grating element considering an interaction between the factors, so that the pitch and/or the longitudinal direction of the recess pattern is not essentially limited thereto.

FIG. 2 is a perspective view conceptually illustrating a module having multiple pattern areas according to a first aspect of the present invention.

The module having multiple pattern areas according to the first aspect of the present invention may be a mold for a diffraction grating module for manufacturing the diffraction grating module 10 (see FIG. 1).

The diffraction grating module 10 may include a first diffraction grating element DOE1 and a second diffraction grating element DOE2 having different diffraction grating patterns. Herein, the first diffraction grating element DOE1 and the second diffraction grating element DOE2 within the diffraction grating module 10 may have a set alignment relationship. That is, a spaced distance of a layout, a disposition angle, and the like of the second diffraction grating element DOE2 with respect to a layout of the first diffraction grating element DOE1, as well as shapes and sizes of the diffraction grating elements DOE1 and DOE2, are determined and set through an intended geometric/diffraction optical design reference.

In addition, the diffraction grating module 10 may further include a third diffraction grating element DOE3 having a different diffraction grating pattern from that of at least one of the first diffraction grating element DOE1 and the second diffraction grating element DOE2. In this case, the first diffraction grating element DOE1, the second diffraction grating element DOE2, and the third diffraction grating element DOE3 within the diffraction grating module 10 may have a set alignment relationship. That is, a spaced distance of a layout, a disposition angle, and the like of each of the second diffraction grating element DOE2 and the third diffraction grating element DOE3 with respect to the layout of the first diffraction grating element DOE1, as well as shapes and sizes of the diffraction grating elements DOE1, DOE2, and the third diffraction grating element DOE3, are determined and set through an intended geometric/diffraction optical design reference.

As an example of the diffraction grating module 10, the pitches of the diffraction grating patterns of the first diffraction grating element DOE1 and the third diffraction grating element DOE3 are 405 nm, the first diffraction grating pattern P1 and the second diffraction grating pattern P2 are parallel, the pitch of the diffraction grating pattern of the third diffraction grating element DOE3 is 355 nm, and an angle between the first diffraction grating pattern P1 or the second diffraction grating pattern P2 and the third diffraction grating pattern P3 may be 55°.

The mold for the diffraction grating module may be divided into a primary mold for the diffraction grating module including a primary pattern, which is capable of patterning a plurality of patterns (for example, the first diffraction grating pattern and the second diffraction grating pattern) of the diffraction grating module through an imprinting process, and a secondary mold for the diffraction grating module including a secondary pattern, which is capable of patterning a plurality of reverse-image patterns (for example, a pattern having a reverse image of the first diffraction grating pattern and a pattern having a reverse image of the second diffraction grating pattern) having a reverse image of the plurality of patterns of the diffraction grating module through an imprinting process.

The primary pattern of the primary mold for the diffraction grating module may be the reverse image of the plurality of patterns of the diffraction grating module. When the imprinting process is performed by using the primary mold for the diffraction grating mold, the plurality of patterns of the diffraction grating mold may be immediately patterned.

The secondary pattern of the secondary mold for the diffraction grating module may have an image corresponding to the plurality of patterns of the diffraction grating module. When the imprinting process is performed, or the imprinting process and an etch process are sequentially performed by using the secondary mold for the diffraction grating module, it is possible to manufacture a master mold for the diffraction grating module, in which the reverse image of the plurality of patterns of the diffraction grating module is patterned. The master mold for the diffraction grating module may be the primary mold for the diffraction grating module.

When the imprinting process is performed, or the imprinting process and an etch process are performed several times by using the secondary mold for the diffraction grating module, it is possible to manufacture the plurality of primary molds for the diffraction grating module, and when the plurality of primary molds for the diffraction grating module manufactured as described above is aligned on one substrate and then the imprinting process is performed, there is an advantage in that the number of times of the process is decreased and it is possible to pattern the plurality of patterns of the large amount of diffraction grating modules, compared to the case where the imprinting process is performed by using the single primary mold for the diffraction grating module.

FIG. 2 is an exemplary embodiment of a module having a plurality of pattern areas according to a first aspect of the present invention, and it is assumed that the module having the plurality of pattern areas of FIG. 2 is a secondary mold 200 for a diffraction grating module according to the above description for convenience of the description. For example, in order to pattern the plurality of patterns of the diffraction grating module 10 illustrated in FIG. 1 through the imprinting process, a primary mold 100 for a diffraction grating module having a plurality of pattern areas, which has a reverse image of the plurality of pattern areas of the diffraction grating module 10, is required, and the secondary mold 200 for the diffraction grating module according to the exemplary embodiment may be a mold for a diffraction grating module, which is capable of patterning the plurality of pattern areas of the primary mold 100 for the diffraction grating module through the imprinting process or the imprinting process/etch process.

The mold for the diffraction grating module may include a base substrate 210, and a first area portion DOE1', a second area portion DOE2', and a third area portion DOE3' which are disposed on the base substrate 210.

The first area portion DOE1' may be a portion having a pattern related to the first diffraction grating pattern P1 of the diffraction grating module 10, the second area portion DOE2' may be a portion having a pattern related to the second diffraction grating pattern P2 of the diffraction grating module 10, and the third area portion DOE3' may be a portion having a pattern related to the third diffraction grating pattern P3 of the diffraction grating module 10.

FIGS. 3(A) to 3(F) are perspective views for conceptually illustrating a method of manufacturing a module having multiple pattern areas according to a second aspect of the present invention.

First, an exemplary embodiment according to the second aspect of the present invention will be described based on a method of manufacturing the secondary mold 200 for the diffraction grating module for manufacturing the diffraction grating module 10 including the first diffraction grating element DOE1 and the second diffraction grating element DOE2 having the different diffraction grating patterns.

Figure 3B:
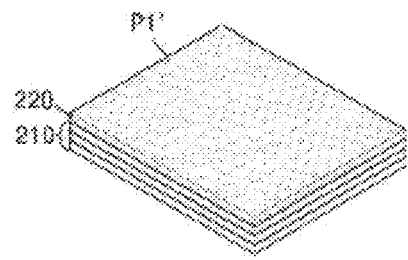
Figure 3C:
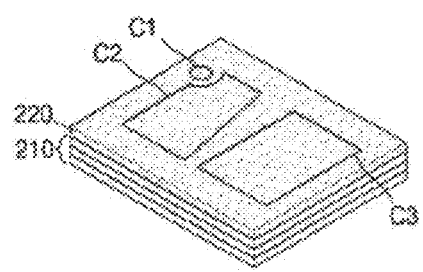
Figure 3D:
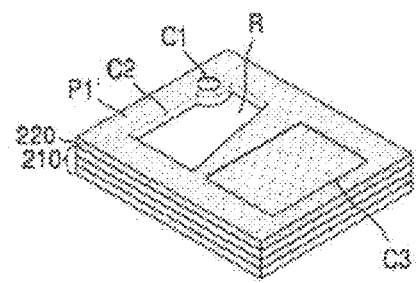
Figure 3E:
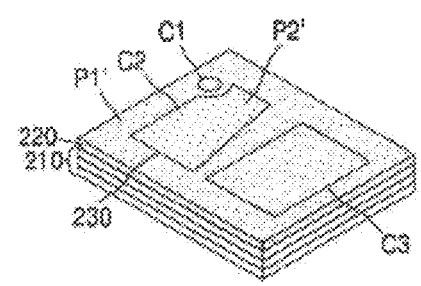
Figure 3F:
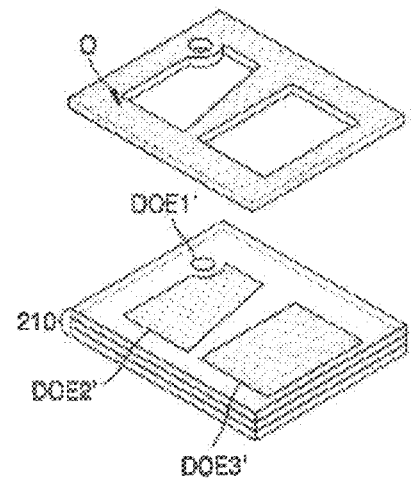

The exemplary embodiment according to the second aspect of the present invention may include: disposing a first substrate formed with a first pattern on a base substrate, as illustrated in FIG. 3(A); forming a first cutting line having a layout corresponding to a layout of a first diffraction grating element on the first substrate, as illustrated in FIG. 3(B); forming a second cutting line having a layout corresponding to a layout of a second diffraction grating element on the first substrate, as illustrated in FIG. 3(C); removing any one of a first area defined by the first cutting line and a second area defined by the second cutting line from the first substrate, as illustrated in FIG. 3(D); disposing a second substrate, which is formed with a second pattern different from the first pattern and has a layout corresponding to a removed area removed from the first substrate, in the removed area, as illustrated in FIG. 3(E); and removing the first substrate from the base substrate while leaving the first area and the second area, as illustrated in FIG. 3(F). Herein, the order of the respective operations is not limited to the order illustrated in FIGS. 3(A), 3(B), 3(C), and the like.

First, the operation of disposing a first substrate 220 formed with a first pattern P1' on the base substrate 210, as illustrated in FIG. 3(A), will be described.

The base substrate 210 may be a structure, in which the first area portion DOE1' and the second area portion DOE2' of the mold for the diffraction grating mold may be disposed. In addition, the base substrate 210 may be a structure, in which the third area portion DOE3' of the mold for the diffraction grating module may also be disposed.

Herein, the base substrate 210 may include a tacky layer 211 having a tacky characteristic. The method of manufacturing the mold for the diffraction grating module according to the exemplary embodiment of the present invention accompanies the process of selectively removing the area cut through the cutting of the substrate corresponding to each diffraction grating element from the base substrate 210 and/or the process of disposing the cut area on the base substrate 210, and in the process of selectively removing the cut area, the cut area needs to be easily detached from the base substrate 210 and in the process of disposing the cut area, fixing force of the cut area with the base substrate 210 needs to be within a predetermined range. Accordingly, in the process of selectively removing the cut area and/or the process of disposing the cut area, alignment accuracy of the cut area may be secured according to a design plan intended by an operator. The tacky layer 211 may include a silicon layer and an acrylic-based and/or urethane-based adhesive layer. The tacky layer 211 may also include a polydimethylsiloxane (PDMS) layer having a buffering characteristic in order to secure uniformity of the pattern through a uniform property of pressure applied to each imprinting area (for example, the first area portion DOE1', the second area portion DOE2', and the third area portion DOE3') in the imprinting process using the manufactured mold for the diffraction grating module.

The base substrate 210 may have a structure, in which a plurality of layers having somewhat high modulus is stacked, in order to prevent an imprinting process defect according to drooping or shape deformation in the imprinting process using the manufactured mold for the diffraction grating module. That is, in order to minimize drooping or shape deformation of the tacky layer 211, the base substrate 210 may include a reinforcing layer 212 including at least one of polyethylene terephthalate (PET), cyclo olefin polymer (COP), and polyimide (PI), which is capable of providing a mechanical property.

The base substrate 210 may include a buffering layer 213 for additionally securing uniformity of the pattern patterned in the imprinting process using the manufactured mold for the diffraction grating module. For example, the buffering layer 213 may be a porous layer, such as forming polyurethane.

Herein, the first substrate 220 may be a plastic film. For example, the first substrate 220 may be a polycarbonate (PC) layer 221, and a urethane acrylate layer 222, which is disposed on the PC layer and is formed with a pattern.

Herein, the first pattern P1' may be disposed on the first substrate 220 by the imprinting process, and according to the exemplary embodiment, the first pattern P1' may also be a recess pattern corresponding to the first diffraction grating pattern P1 of the first diffraction grating element DOE1, and may also be a recess pattern having a reverse image for the first diffraction grating pattern P1. The exemplary embodiment according to the second aspect of the present invention is the method of manufacturing the secondary mold 200 for the diffraction grating module, so that the first pattern P1' is the recess pattern corresponding to the first diffraction grating pattern P1. When the exemplary embodiment according to the second aspect of the present invention is the method of manufacturing the primary mold for the diffraction grating module, the first pattern is the recess pattern having the reverse image for the first diffraction grating pattern.

Next, the operation of forming a first cutting line C1 of a layout corresponding to a layout of the first diffraction grating element DOE1 on the first substrate 220, as illustrated in FIG. 3(B), will be described.

In the description of the present invention, the forming of the cutting line may mean half-cutting, in which the base substrate is not cut or the base substrate is not cut in a depth, by which the base substrate is completely cut, even though the base substrate is cut, and the first substrate is cut. Further, the means for forming the cutting line may be a blade of a knife or a laser, and it is necessary to form the cutting line along the layout that is a looped curve, so that it is more preferable to use a laser.

Herein, "the layout corresponding to the layout of the first diffraction grating element may mean "a layout of an image corresponding to the layout of the first diffraction grating element" according to the exemplary embodiment, and may also mean "a layout having the reverse image for the layout of the first diffraction grating element". The exemplary embodiment according to the second aspect of the present invention is the method of manufacturing the secondary mold 200 for the diffraction grating module, so that the layout of the first cutting line C1 is the image corresponding to the layout of the first diffraction grating element DOE1. When the exemplary embodiment according to the second aspect of the present invention is the method of manufacturing the primary mold the diffraction grating module, the layout of the first cutting line may be the reverse image for the layout of the first diffraction grating element.

Next, the operation of forming a second cutting line C2 of a layout corresponding to a layout of the second diffraction grating element DOE2 on the first substrate 220, as illustrated in FIG. 3(C), will be described.

Herein, "the layout corresponding to the layout of the second diffraction grating element may mean "a layout of an image corresponding to the layout of the second diffraction grating element" according to the exemplary embodiment, and may also mean "a layout having the reverse image for the layout of the second diffraction grating element". The exemplary embodiment according to the second aspect of the present invention is the method of manufacturing the secondary mold 200 for the diffraction grating module, so that the layout of the second cutting line C2 is the image corresponding to the layout of the second diffraction grating element DOE2. When the exemplary embodiment according to the second aspect of the present invention is the method of manufacturing the primary mold the diffraction grating module, the layout of the second cutting line may be the reverse image for the layout of the second diffraction grating element.

Next, the operation of removing any one of a first area defined by the first cutting line C1 and a second area defined by the second cutting line C2 from the first substrate 220, as illustrated in FIG. 3(D), will be described.

In the exemplary embodiment according to the second aspect of the present invention, the first pattern P1' may be a recess pattern having the same pitch as that of the first diffraction grating pattern P1' of the first diffraction grating element DOE1 and may be a recess pattern having a different pitch from that of the second diffraction grating pattern P2 of the second diffraction grating element DOE2.

Accordingly, the second area defined by the second cutting line C2 may be removed from the first substrate 220.

In the operations illustrated in FIGS. 3(B) and 3(C), the first cutting line C1 and the second cutting line C2 may be formed so as to correspond to the alignment relationship set between the first diffraction grating element DOE1 and the second diffraction grating element DOE2 within the diffraction grating module 10.

Next, the operation of disposing a second substrate 230, which is formed with a second pattern P2' different from the first pattern P1' and has a layout corresponding to a removed area R removed from the first substrate 220, in the removed area R, as illustrated in FIG. 3(E), will be described.

Herein, the second substrate 230 may be a plastic film similar to the first substrate 220. For example, the second substrate 230 may be a polycarbonate (PC) layer 231, and a urethane acrylate layer 232, which is disposed on the PC layer and is formed with a pattern.

Herein, the second pattern P2' may be disposed on the second substrate 230 by the imprinting process, and according to the exemplary embodiment, the second pattern P2' may be a recess pattern corresponding to the second diffraction grating pattern of the second diffraction grating element, and may also be a recess pattern having a reverse image for the second diffraction grating pattern. The exemplary embodiment according to the second aspect of the present invention is the method of manufacturing the secondary mold 200 for the diffraction grating module, so that the second pattern P2' is the recess pattern corresponding to the second diffraction grating pattern P2. When the exemplary embodiment according to the second aspect of the present invention is the method of manufacturing the primary mold for the diffraction grating module, the second pattern is the recess pattern having the reverse image for the second diffraction grating pattern.

Herein, "the disposing the second substrate in the removed area" may mean inserting the second substrate in a layout of the removed area. This has an advantage in that the second substrate 230 is easily aligned by the layout of the removed area R.

Next, the operation of removing the first substrate from the base substrate while leaving the first area and the second area, as illustrated in FIG. 3(F), will be described.

Herein, "leaving the second area" may mean "leaving the second substrate 230 disposed in the removed area R".

Accordingly, it is possible to manufacture the module having the multiple pattern areas (in the present exemplary embodiment, the secondary mold for the diffraction grating module) having the structure, in which the first substrate DOE1' (hereinafter, referred to as "the first area portion") including the first pattern P1' and occupying the first area and the second substrate DOE2' (hereinafter, referred to as "the second area portion") including the second pattern P2' and occupying the second area are disposed on the base substrate 210.

In the secondary mold 200 for the diffraction grating module, the first area portion DOE1' is for the purpose of forming "the pattern having the reverse image of the first diffraction grating pattern" in a primary mold 200' for a diffraction grating module through the imprinting process or the imprinting process/etch process. Further, in the secondary mold 200 for the diffraction grating module, the second area portion DOE2' is for the purpose of forming "the pattern having the reverse image of the second diffraction grating pattern" in the primary mold 200' for the diffraction grating module through the imprinting process or the imprinting process/etch process.

A second exemplary embodiment according to the second aspect of the present invention may be a method of manufacturing a secondary mold 200 for a diffraction grating module for manufacturing a diffraction grating module 10 when the diffraction grating module 10 includes a third diffraction grating element DOE3 having the different diffraction grating pattern from at least one of the first diffraction grating element DOE1 and the second diffraction grating element DOE2.

The second exemplary embodiment according to the second aspect of the present invention may further include forming a third cutting line C3 of a layout corresponding to a layout of the third diffraction grating element DOE3 in the first substrate 220, compared to the exemplary embodiment according to the second aspect of the present invention, as illustrated in FIG. 3(C).

In the operation for forming a third cutting line C3, "the layout corresponding to the layout of the third diffraction grating element" may mean "a layout having an image corresponding to the layout of the third diffraction grating element" according to the exemplary embodiment, and may mean "a layout having a reverse image corresponding to the layout of the third diffraction grating element". The second exemplary embodiment according to the second aspect of the present invention is the method of manufacturing the secondary mold 200 for the diffraction grating module, so that the layout of the third cutting line C3 is the image corresponding to the layout of the third diffraction grating element DOE3. When the exemplary embodiment according to the second aspect of the present invention is the method of manufacturing the primary mold for the diffraction grating module, the layout of the third cutting line may be the reverse image for the layout of the third diffraction grating element.

The first cutting line C1, the second cutting line C2, and the third cutting line C3 may be formed so as to correspond to the alignment relationship set between the first diffraction grating element DOE1, the second diffraction grating element DOE2, and the third diffraction grating element DOE3 within the diffraction grating module 10.

In the meantime, a third area may be defined by the third cutting line C3.

In the second exemplary embodiment according to the second aspect of the present invention, a first pattern P1' may be a recess pattern having the same pitch as that of the third diffraction grating pattern P3 of the third diffraction grating element DOE3 and may be a recess pattern having a different pitch from that of the second diffraction grating pattern P2 of the second diffraction grating element DOE2.

In this case, the first substrate may be removed from the base substrate while leaving the first area, the second area, and the third area, as illustrated in FIG. 3(*f*).

Accordingly, it is possible to manufacture the module having the multiple pattern areas (in the present exemplary embodiment, the secondary mold for the diffraction grating module) having the structure, in which a first substrate DOE1' (hereinafter, referred to as "a first area portion") including a first pattern P1' and occupying the first area, a second substrate DOE2' (hereinafter, referred to as "a second area portion") including a second pattern P2' and occupying the second area, and a first substrate DOE3 (hereinafter, referred to as "a third area portion") including the first pattern and occupying the third area, are disposed on the base substrate 210.

In the secondary mold 200 for the diffraction grating module, the first area portion DOE1' is for the purpose of forming "the pattern having the reverse image of the first diffraction grating pattern" in the primary mold 200' for a diffraction grating module through the imprinting process or the imprinting process/etch process. Further, in the secondary mold 200 for the diffraction grating module, the second area portion DOE2' is for the purpose of forming "the pattern having the reverse image of the second diffraction grating pattern" in the primary mold for the diffraction grating module through the imprinting process or the imprinting process/etch process. Further, in the secondary mold 200 for the diffraction grating module, the third area portion DOE3' is for the purpose of forming "the pattern having the reverse image of the third diffraction grating pattern" in the primary mold for the diffraction grating module through the imprinting process or the imprinting process/etch process.

In a situation where it is necessary to change a design for changing at least one of the layouts of the diffraction grating elements, the alignment relationship, and the pitch of the diffraction grating pattern in the diffraction grating module desired to be manufactured, it is possible to easily manufacture the mold for the diffraction grating module for manufacturing the diffraction grating module, in which an existing factor is changed, only by changing the layout of the cutting line corresponding to the factors, which need to be changed, and the alignment relationship, and/or performing the change to the substrate having the different pattern from that of the existing substrate without changing the factors, which do not need to be changed, when the manufacturing method according to one aspect of the present invention is used.

FIGS. 4(A) to 4(G) and 5(A) and 5(B) are perspective views conceptually describing a method of manufacturing a diffraction grating module or a mold for a diffraction grating module according to a third aspect of the present invention.

The manufacturing method according to the third aspect of the present invention may include: preparing the module having the multiple pattern areas manufactured according to the second aspect of the present invention; applying a resin composition on the module having the multiple pattern areas; forming a corresponding pattern area corresponding to the multiple pattern areas by curing the resin composition; and separating the module having the multiple pattern areas from the corresponding pattern area.

When it is assumed that the module having the multiple pattern areas manufactured according to the second aspect of the present invention is the secondary mold for the diffraction grating module, an exemplary embodiment of the manufacturing method according to the third aspect of the present invention may correspond to the method of manufacturing the primary mold for the diffraction grating module.

Figure 4A:
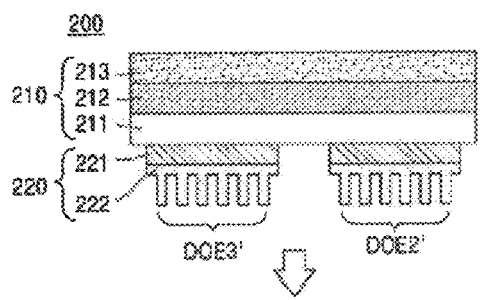
FIGS. 4(A) to 4(G) are perspective views conceptually illustrating a method of manufacturing a diffraction grating module or a mold for a diffraction grating module according to a third aspect of the present invention.

First, as illustrated in FIG. 4(a), the secondary mold for the diffraction grating module having the multiple pattern areas is prepared. In FIG. 4(a), the illustration of a first area portion DOE1' is omitted for convenience of the description, and a pitch of a pattern of a second area portion DOE2' is different from a pitch of a pattern of a third area portion DOE3', and the alignments of the respective patterns may not be parallel, but the expression thereof is omitted. Herein, the multiple pattern area portions DOE1', DOE2', and DOE3' of the secondary mold for the diffraction grating module are images corresponding to the diffraction grating elements DOE1, DOE2, and DOE3 of the diffraction grating module 10.

Then, a resin composition for imprinting is applied on the secondary mold 200 for the diffraction grating module. In this case, a base substrate 310 for imprinting may be disposed so as to face the multiple pattern area portions DOE1', DOE2', and DOE3' of the secondary mold 200 for the diffraction grating module, and then the secondary mold 200 for the diffraction grating module and the resin composition for imprinting may be supplied. In this case, all of the recess patterns on the multiple pattern area portions DOE1', DOE2', and DOE3' of the secondary mold 200 for the diffraction grating module may be filled with the resin composition for imprinting by applying heat or ultraviolet rays. The resin composition for imprinting may be, for example, a resin prepared by diluting and mixing and dispersing nano scale particles of zirconia ($ZrO_2$) and titania ($TiO_2$) in dipentaerythriol hexa acrylate (DPHA) or urethane acrylate in a predetermined ratio by using a solvent, such as PGMEA, MEK, and MIBK. In addition, the resin composition may be prepared by additionally including the small amount of a photoinitiator.

Then, first corresponding pattern area portions DOE1", DOE2", and DOE3" corresponding to the multiple pattern area portions DOE1', DOE2', and DOE3' are formed by curing the resin composition for imprinting. Accordingly, a resist layer 320 for imprinting formed with the first corresponding pattern area portions DOE1", DOE2", and DOE3" may be disposed on the base substrate 310 for imprinting. Accordingly, the first corresponding pattern area portions DOE1", DOE2", and DOE3" of the resist layer 320 for imprinting are reverse images for the diffraction grating elements DOE1, DOE2, and DOE3 of the diffraction grating module 10.

Then, the secondary mold 200 for the diffraction grating module is separated from the resist layer 320 for imprinting.

Figure 4B:
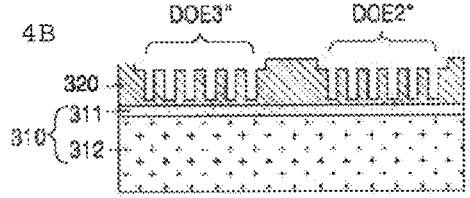

The structure including the base substrate 310 for imprinting and the resist layer 320 for imprinting may be immediately used as the primary mold for the diffraction grating module, as illustrated in FIG. 4(b).

Figure 4C:
Figure 4D:
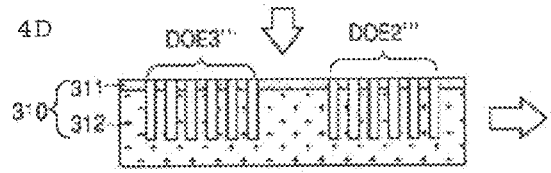

Instead of this, by performing etching on the base substrate 310 for imprinting by using the first corresponding pattern area portions DOE1", DOE2", and DOE3" formed in the resist layer 320 for imprinting for supplementing durability and the like, the base substrate 310 formed with second corresponding pattern area portions DOE1''', DOE2''' and DOE3''' corresponding to the first corresponding pattern area portions DOE1", DOE2", and DOE3" may also be used as the primary mold for the diffraction grating module. In this case, the base substrate 310 for imprinting may include a first etch layer 311 and a second etch layer 312. The first etch layer 311 may be a layer including aluminum (Al), and the second etch layer 312 may be a layer including silicon oxide ($SiO_2$) Etching is performed on the first etch layer 311 positioned under the resist layer 320 for imprinting according to the patterns of the first corresponding pattern area portions DOE1", DOE2", and DOE3" formed in the resist layer 320 for imprinting by a predetermined depth, and then the resist layer 320 for imprinting is removed, as illustrated in FIG. 4(C). Etching is performed on the second etch layer 312 positioned under the first etch layer 311 according to the pattern etched in the first etch layer 311 by a predetermined depth, as illustrated in FIG. 4(D). Then, the first etch layer 311 is removed, as illustrated in FIG. 4(E). Accordingly, the second corresponding pattern area portions DOE1''', DOE2''', and DOE3''' corresponding to the first corresponding pattern area portions DOE1", DOE2", and DOE3" may be formed in the base substrate 310 for imprinting, particularly, the second etch layer 312 on the base substrate 310 for imprinting. Herein, the second corresponding pattern area portions DOE1''', DOE2''', and DOE3''' are etched according to the patterns of the first corresponding pattern area portions DOE1", DOE2", and DOE3" and patterned, so that the second corresponding pattern area portions DOE1''', DOE2''', and DOE3''' are reverse images for the diffraction grating elements DOE1, DOE2, and DOE3 of the diffraction grating module 10, similar to the first corresponding pattern area portions DOE1", DOE2", and DOE3". The second etch layer 312 of the base substrate 310 for imprinting manufactured as described above may be used as a primary mold 400 for a diffraction grating module.

FIG. 6 is an image obtained by photographing a result of the performance up to the operation illustrated in FIG. 4(C).

FIG. 7 is an image obtained by photographing a result of emitting light to the primary mold 400 for the diffraction grating module manufactured by performing the process up to the operation illustrated in FIG. 4(E).

As the result of the emission of light to the second corresponding pattern first area portion DOE1''' corresponding to the first diffraction grating element DOE1 of the diffraction grating module 10 desired to be manufactured, it can be confirmed that the light is diffracted on the first area portion DOE1''' and progresses toward the second corresponding pattern second area portion DOE2''' corresponding to the second diffraction grating element DOE2 of the diffraction grating module 10, and the light progresses toward the second corresponding pattern third area portion DOE3''' corresponding to the third diffraction grating element DOE3 of the diffraction grating module 10 on the second area portion DOE2''' in the state where the light is expanded in a down direction, and the light is diffracted on the third area portion DOE3''' and progresses to the side opposite to one surface, into which the light is initially incident. It is possible to confirm that the light progresses in a desired path by using the primary mold 400 for the diffraction grating module, so that the diffraction grating module 10 manufactured through the imprinting process by using the primary mold 400 for the diffraction grating module may also diffract light as being intended, perform the exit pupil expansion, and make the light reach a pupil of a user.

A method of manufacturing the diffraction grating module 10 through the imprinting process by using the primary mold 400 for the diffraction grating module will be described.

First, a resin composition for imprinting is applied on the primary mold 400 for the diffraction grating module. In this case, a diffraction grating module base substrate 510 may be disposed so as to face the second corresponding pattern area portions DOE1''', DOE2''', and DOE3''' of the primary mold 400 for the diffraction grating module, and then the primary mold 400 for the diffraction grating module and the resin composition for imprinting may be supplied. In this case, all of the recess patterns on the second corresponding pattern area portions DOE1''', DOE2''', and DOE3''' of the primary mold 400 for the diffraction grating module may be filled with the resin composition for imprinting by applying heat or ultraviolet rays.

Then, diffraction grating patterns P1, P2, and P3 corresponding to the second corresponding pattern area portions DOE1''', DOE2'41, and DOE3''' are formed by curing the resin composition for imprinting. Accordingly, a high-refractive resin layer 520 formed with the diffraction grating patterns P1, P2, and P3 may be disposed on the diffraction grating module base substrate 510, as illustrated in FIG. 4(F).

Herein, the resin composition for imprinting is the material used as a material of the layer, on which the diffraction grating patterns P1, P2, and P3 for diffracting incident light is formed so that the light incident to the diffraction grating module 10 is totally reflected in an optical waveguide, so that the resin composition for imprinting may be a resin having a high refractive characteristic in order to increase a size of a virtual image entering the pupil and an angle of view through a see-through optical system. In the meantime, a refractive index of the layer, on which the diffraction grating patterns are formed, may be a value related to a permitted incidence angle of light, at which light output from a micro light source output element may enter the diffraction grating module and the first diffraction grating pattern P1, together with the nano scale pitch of the diffraction grating pattern. Accordingly, a high refractive index of the layer, on which the diffraction grating patterns are formed, may contribute to broadening the range of the permitted incidence angle of light, and increasing a ratio of diffraction and refraction of the incident light in an intended direction by the diffraction grating pattern. As a material of the layer forming the diffraction grating pattern, for example, a resin using at least one of a copolymer of a curable acrylate-based resin formed by substituting an aromatic group including a thiol-based sulfuric compound, diaryl isophthalate, in which divalent alcohol is added to diaryl isophthalate, and diethylene glycol bis aryl carbonate; and a copolymer of xylene diisocyanate, 1, 2-bis mercapto ethyl-3-mercapto propane, and polymethyl meta acrylate may be preferred. In order to obtain a higher refractive index, an inorganic material-based hybrid resin may be preferred. The hybrid resin may be obtained by mixing nano particles of a metal oxide (a zirconium oxide, a titanium oxide, a tungsten oxide, a hafnium oxide, and an aluminum oxide) of 50 nm or less with a predetermined ratio by using a curable resin as a matrix. Accordingly, the curable polymer matrix characteristic may make processability of the imprinting process easy and the inorganic nano particle characteristic may make the adjustment of a refractive index easy. Herein, for a curing reaction by ultraviolet rays or heat, a small amount of photosensitizer material or hardening agent for heat curing may be added according to a process.

Herein, the diffraction grating module base substrate 510 is a portion serving as an optical waveguide, in which the light diffracted through the diffraction grating patterns P1, P2, and P3 of the diffraction grating module 10 is totally reflected and progresses, so that in order to secure a wide angle of view, a material of the diffraction grating module base substrate 510 may be a transparent glass or plastic material having the same refractive index as that of the diffraction grating pattern. For example, as the plastic material used in the diffraction grating module base substrate, a substrate having a high refractive characteristic obtained by heat curing a resin using at least one of a copolymer of a curable acrylate-based resin formed by substituting an aromatic group including a thiol-based sulfuric compound, diaryl isophthalate, in which divalent alcohol is added to diaryl isophthalate, and diethylene glycol bis aryl carbonate; and a copolymer of xylene diisocyanate, 1, 2-bis mercapto ethyl-3-mercapto propane, and polymethyl meta acrylate, and performing film casting and grinding may be used. In order to obtain a higher refractive index, a high refractive glass substrate including a high refractive oxide selected from the group consisting of $TiO_2$, $BaO_2$, $LaO_2$, and $Bi_2O_3$; and one kind or more of additives selected from the group consisting of MgO, CaO, ZnO, $ZrO_2$, $Al_2O_3$, $K_2O$, $Na_2O$, $Li_2O$, and SrO may be used, and the glass substrate having a refractive index of 1.6 or more and 2.0 or less in a visible ray region having a wavelength of 550 nm may be preferred.

Further, the primary mold 400 for the diffraction grating module, the high refractive resin layer 520, and the diffraction grating module base substrate 510 are separated from each other.

Figure 4G:
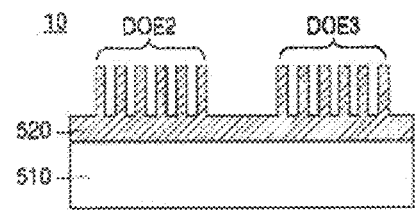
Figure 4F:
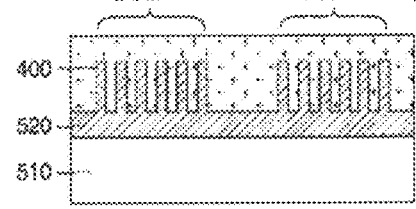
Figure 4E:
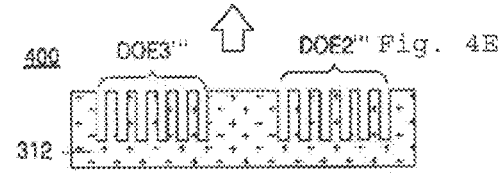

The structure including the high refractive resin layer 520 and the diffraction grating module base substrate 510 manufactured as described above may be the diffraction grating module 10 including the diffraction grating elements DOE1, DOE2, and DOE3, as illustrated in FIG. 4(G).

In the meantime, when it is assumed that the module having the multiple pattern areas manufactured according to the second aspect is the primary mold for the diffraction grating module, an exemplary embodiment of a manufacturing method according to a third aspect of the present invention may correspond to a method of manufacturing a diffraction grating module.

First, as illustrated in FIG. 5(A), a primary mold 600 for a diffraction grating module that is a module having multiple pattern areas is prepared. In FIG. 5(A), the illustration of a first area portion DOE1' is omitted for convenience of the description, and a pitch of a pattern of a second area portion DOE2' is different from a pitch of a pattern of a third area portion DOE3', and the alignments of the respective patterns may not be parallel, but the expression thereof is omitted. Herein, the multiple pattern area portions DOE1', DOE2', and DOE3' of the primary mold for the diffraction grating module are reverse images for the diffraction grating elements DOE1, DOE2, and DOE3 of the diffraction grating module 10.

Further, a resin composition for imprinting is applied onto the primary mold 600 for the diffraction grating module. In this case, a diffraction grating module base substrate 710 may be disposed so as to face the multiple pattern area portions DOE1', DOE2', and DOE3' of the primary mold 600 for the diffraction grating module, and then the primary mold 600 for the diffraction grating module and the resin composition for imprinting may be supplied. In this case, all of the recess patterns on the multiple pattern area portions DOE1', DOE2', and DOE3' of the primary mold 600 for the diffraction grating module may be filled with the resin composition for imprinting by applying heat or ultraviolet rays.

Then, diffraction grating patterns P1, P2, and P3, which are corresponding pattern areas corresponding to the multiple pattern area portions DOE1', DOE2', and DOE3' of the primary mold 600 for the diffraction grating module are formed by curing the resin composition for imprinting. Accordingly, a high-refractive resin layer 720 formed with the diffraction grating patterns P1, P2, and P3 may be disposed on the diffraction grating module base substrate 710. Herein, the resin composition for imprinting is used as the material of the layer, on which the diffraction grating patterns P1, P2, and P3 for diffracting incident light are formed so that the light incident to the diffraction grating module 10 is totally reflected in an optical waveguide, so that the resin composition for imprinting may be a resin having a high refractive characteristic in order to increase a size of a virtual image entering the pupil and an angle of view through a see-through optical system. In the meantime, a refractive index of the layer, on which the diffraction grating patterns are formed, is a value related to a permitted incidence angle of light, at which light output from a micro light source output element may enter the diffraction grating module and the first diffraction grating pattern P1, together with the nano scale pitch of the diffraction grating pattern. Accordingly, a high refractive index of the layer, on which the diffraction grating patterns are formed, may contribute to broadening the range of the permitted incidence angle of light, and increasing a ratio of diffraction and refraction of the incident light in an intended direction by the diffraction grating pattern. As a material of the layer forming the diffraction grating pattern, for example, a resin using at least one of a copolymer of a curable acrylate-based resin formed by substituting an aromatic group including a thiol-based sulfuric compound, diaryl isophthalate, in which divalent alcohol is added to diaryl isophthalate, and diethylene glycol bis aryl carbonate; and a copolymer of xylene diisocyanate, 1, 2-bis mercapto ethyl-3-mercapto propane, and polymethyl meta acrylate may be preferred. In order to obtain a higher refractive index, an inorganic material-based hybrid resin may be used. The hybrid resin may be obtained by mixing nano particles of a metal oxide (a zirconium oxide, a titanium oxide, a tungsten oxide, a hafnium oxide, and an aluminum oxide) of 50 nm or less with a predetermined ratio by using a curable resin as a matrix. Accordingly, the curable polymer matrix characteristic may make processability of the imprinting process easy and the inorganic nano particle characteristic may make the adjustment of a refractive index easy. Herein, for a curing reaction by ultraviolet rays or heat, a small amount of photosensitizer material or hardening agent for heat curing may be added according to a process.

Herein, the diffraction grating module base substrate 710 is a portion serving as an optical waveguide, in which the light diffracted through the diffraction grating patterns P1, P2, and P3 of the diffraction grating module 10 is totally reflected and progresses, so that in order to secure a wide angle of view, a material of the diffraction grating module base substrate 710 may be a transparent glass or plastic material having the same refractive index as that of the diffraction grating pattern. For example, as the plastic material used in the diffraction grating module base substrate, a substrate having a high refractive characteristic obtained by heat curing a resin using at least one of a copolymer of a curable acrylate-based resin formed by substituting an aromatic group including a thiol-based sulfuric compound, diaryl isophthalate, in which divalent alcohol is added to diaryl isophthalate, and diethylene glycol bis aryl carbonate; and a copolymer of xylene diisocyanate, 1, 2-bis mercapto ethyl-3-mercapto propane, and polymethyl meta acrylate, and performing film casting and grinding may be used. In order to obtain a higher refractive index, a high refractive glass substrate including a high refractive oxide selected from the group consisting of $TiO_2$, $BaO_2$, $LaO_2$, and $Bi_2O_3$; and one kind or more of additives selected from the group consisting of MgO, CaO, ZnO, $ZrO_2$, $Al_2O_3$, $K_2O$, $Na_2O$, $Li_2O$, and SrO may be used, and the glass substrate having a refractive index of 1.6 or more and 2.0 or less in a visible ray region having a wavelength of 550 nm may be preferred.

Then, the primary mold 600 for the diffraction grating module, the high refractive resin layer 720, and the diffraction grating module base substrate 710 are separated from each other.

The structure including the high refractive resin layer 720 and the diffraction grating module base substrate 710 manufactured as described above may be the diffraction grating module 10 including the diffraction grating elements DOE1, DOE2, and DOE3, as illustrated in FIG. 5(B).

In the foregoing exemplary embodiments, some examples of the present technical spirit are described, and the scope of the present technical spirit is not limited to the foregoing exemplary embodiments, and various changes, modifications, or substitutions may be made within the scope of the present technical spirit by those skilled in the art. For example, the configurations and the characteristics described together in the specific exemplary embodiment may be dispersed from each other and carried out, and the configurations and the characteristics described in each of the different exemplary embodiments may be carried out in a combination form. Similarly, the configurations and the characteristics described in each claim may be dispersed from each other and carried out, or combined and carried out. Further, all of the carried configurations and characteristics shall be considered to belong to the scope of the present technical spirit.

The invention claimed is:

1. A method of manufacturing a module having multiple pattern areas to manufacture a diffraction grating module including a first diffraction grating element and a second diffraction grating element having different diffraction grating patterns, the method comprising:
  (a) disposing a first substrate having a first pattern on a first base substrate;
  (b) forming a first cutting line on the first substrate, wherein a first layout of the first cutting line corresponds to a first diffraction grating element;
  (c) forming a second cutting line on the first substrate, wherein a second layout of the second cutting line corresponds to a second diffraction grating element;
  (d) removing any one of a first area defined by the first cutting line and a second area defined by the second cutting line from the first substrate to form a removed area on the first substrate;
  (e) disposing a second base substrate having a second pattern different from the first pattern in the removed area, the second base pattern having a layout corresponding to the removed area of the first substrate; and (f) removing the first substrate from the base substrate without removing the first area and the second area.

2. The method of claim 1, wherein an alignment relationship between the first diffraction grating element and the second diffraction grating element is set in a diffraction grating module, and wherein the first cutting line or the second cutting line corresponds to the alignment relationship.

3. The method of claim 1, wherein a shape of the first layout of the first cutting line corresponds to a shape of the first diffraction grating element, and a shape of the second layout of the second cutting line corresponds to a shape of the second diffraction grating element.

4. The method of claim 1, wherein a shape of the first layout of the first cutting line is a reverse of a shape of the first diffraction grating element, and a shape of the second layout of the second cutting line is a reverse of a shape of the second diffraction grating element.

5. The method of claim 1, wherein the diffraction grating module includes a third diffraction grating element having a different diffraction grating pattern from the diffraction grating pattern of at least one of the first diffraction grating element and the second diffraction grating element, and the method further includes (g) forming a third cutting line having a third layout corresponding to=the third diffraction grating element on the first substrate, and a third area is defined by the third cutting line, and the first substrate is removed from the base substrate without removing the first area, the second area, and the third area.

6. The method of claim 5, wherein an alignment relationship between the first diffraction grating element, the second diffraction grating element, and the third diffraction grating element is set within a diffraction grating module, and wherein the first cutting line, the second cutting line, or the third cutting line corresponds to the alignment relationship.

7. The method of claim 5, wherein a shape of the first layout of the first cutting line corresponds to a shape of the first diffraction grating element, a shape of the second layout of the second cutting line corresponds to a shape of the second diffraction grating element, and a shape of the third layout of the third cutting line corresponds to a shape of the third diffraction grating element.

8. The method of claim 5, wherein a shape of the first layout of the first cutting line is a reverse of a shape of the first diffraction grating element, a shape of the second layout of the second cutting line is a reverse of a shape of the second diffraction grating element, and a shape of the third layout of the third cutting line is a reverse of a shape of the third diffraction grating element.

9. A module having multiple pattern areas manufactured by the manufacturing method of claim 1.

10. The module of claim 9, wherein the module having multiple pattern areas is a mold for manufacturing a diffraction grating module including a first diffraction grating element and a second diffraction grating element having different diffraction grating patterns.

11. A method of manufacturing a diffraction grating module or a mold for a diffraction grating module, the method comprising:

preparing the module of claim 9;

applying a resin composition on the module;

curing the resin composition to form pattern areas corresponding to the multiple pattern areas of the module; and separating the module and the corresponding pattern areas.

* * * * *